United States Patent [19]
Iwai et al.

[11] Patent Number: 5,446,569
[45] Date of Patent: Aug. 29, 1995

[54] LIQUID CRYSTAL DISPLAY APPARATUS HAVING A RANDOM ORIENTATION ALIGNMENT FILM AND A METHOD FOR PRODUCING THE SAME

[75] Inventors: Yoshio Iwai, Takatsuki; Shigehiro Sato; Hideaki Mochizuki, both of Osaka; Hiroaki Mizuno, Katano; Shinya Kosako, Kadoma; Hisako Kurai, Amagasaki, all of Japan

[73] Assignee: Matsushita Electric Industrial Co., Ltd., Osaka, Japan

[21] Appl. No.: 285,862

[22] Filed: Aug. 4, 1994

[30] Foreign Application Priority Data

| Aug. 4, 1993 | [JP] | Japan | 5-193357 |
| Aug. 6, 1993 | [JP] | Japan | 5-195715 |
| Sep. 2, 1993 | [JP] | Japan | 5-218330 |
| Oct. 6, 1993 | [JP] | Japan | 5-250480 |
| Dec. 6, 1993 | [JP] | Japan | 5-305124 |

[51] Int. Cl.$^6$ .................................. G02F 1/1337
[52] U.S. Cl. ........................... 359/78; 359/76; 359/75
[58] Field of Search ................ 359/75, 78, 76, 102

[56] References Cited

U.S. PATENT DOCUMENTS

| 4,878,742 | 11/1989 | Ohkubo et al. | 359/75 |
| 5,004,324 | 4/1991 | Leenhouts et al. | 359/78 |
| 5,023,013 | 6/1991 | Yamazaki et al. | 359/75 |
| 5,091,794 | 2/1992 | Suzuki | 359/78 |

FOREIGN PATENT DOCUMENTS

| 6034978 | 2/1994 | Japan | 359/75 |
| 6043462 | 2/1994 | Japan | 359/75 |

OTHER PUBLICATIONS

Y. Toko, et al., "P-49: TN-LCDs Fabricated by Non-Rubbing Showing Wide and Homogeneous Viewing Angular Characteristics and Excellent Voltage Holding Ratio", *SID 93 Digest*, pp. 622–625 (May 18–20, 1993).

*Primary Examiner*—Anita Pellman Gross
*Assistant Examiner*—Tiep H. Nguyen
*Attorney, Agent, or Firm*—Ratner & Prestia

[57] ABSTRACT

A liquid crystal display apparatus includes: a pair of substrates held at a distance; a pair of electrodes formed on opposing inner faces of the substrates, respectively; alignment films formed on the opposing faces to cover the pair of electrodes, respectively, the alignment films having capability to align a liquid crystal in a horizontal orientation and capability to align the liquid crystal in a random orientation at a predetermined temperature or more; and a chiral nematic liquid crystal layer interposed between the pair of alignment film, the chiral nematic liquid crystal layer having a plurality of microscopic domains, each of the microscopic domains having the liquid crystal molecules aligned uniformly in the vicinity of the alignment films, the liquid crystal molecules in different microscopic regions being arranged in different directions with respect to one another.

24 Claims, 4 Drawing Sheets

LIQUID CRYSTAL DISPLAY APPARATUS HAVING A RANDOM ORIENTATION ALIGNMENT FILM AND A METHOD FOR PRODUCING THE SAME

BACKGROUND OF THE INVENTION

1. Field of the Invention

The present invention relates to a liquid crystal display apparatus, and more particularly, to a liquid crystal display apparatus having a wide viewing angle.

2. Description of the Related Art

As the screen size and capacity of the liquid crystal display apparatuses increases, vigorous efforts have been made to increase the use of liquid crystal display apparatuses, which utilize the electrooptic characteristics of a liquid crystal, in wider applications in the field of office automation equipment. Liquid crystal display apparatuses currently in common use are classified by their respective operation modes. Generally, there are two types; twisted nematic (TN) type wherein liquid crystal molecules interposed between two glass substrates show an orientation twisted 90°, and super twisted nematic (STN) type wherein the liquid crystal molecules show orientations twisted 180° to 270°. The TN type is used mainly in active matrix liquid crystal display apparatuses, and the STN type is used in simple matrix type liquid crystal display apparatuses. These apparatuses will be described below with reference to the accompanying drawings.

In the case of the TN type used in active matrix type liquid crystal display apparatuses or in liquid crystal display apparatuses of small sizes, the liquid crystal molecules in the interface with the glass substrate are uniformly oriented in the same direction at a pre-tilt angle to the glass substrate, with the orientation being twisted 90° between the upper and lower glass substrates. The 90° twist in the orientation is obtained, in general, by rubbing rayon fabric or the like against an alignment film comprising a thin polyimide film formed on the glass substrate in one direction, and arranging the upper and lower substrates such that the directions on the two substrates are at right angles to each other.

When a voltage is applied to a TN type liquid crystal display apparatus as shown in FIG. 1, the liquid crystal molecules 101 in the state of orientation twisted 90° begin to respond. As the voltage increases beyond the threshold voltage, the state of twisted orientation decays and replaced by splay orientation, so that the major axes of the liquid crystal molecules 101 are caused to erect out of the plane of the glass substrates 102 and 103. When the liquid crystal molecules 101 are observed in a direction of angle from the normal line (Z axis) of the substrate while changing the azimuth Φ, the major axes of the liquid crystal molecules 101 are not uniform in the direction of azimuth angle. As a result, apparent anisotropy of the index of refraction (Δn) of the liquid crystal molecules 101 changes with the azimuth angle, thereby changing the amount of birefringence (Δnd) which is the apparent anisotropy of the index of refraction multiplied by the thickness of the liquid crystal layer (d). Therefore, when polarizers are arranged on the outward surfaces of the upper and lower glass substrates 102 and 103 so that light absorbing axes 106 and 107 lie perpendicular to the rubbing directions 104, 105 and light is allowed to enter in the -Z axis direction, the intensity of transmitted light varies with the azimuth angle thereby causing asymmetry with respect to the viewing angle. This asymmetry in the viewing angle poses problems. Particularly during display of half tones or gray scales, problems such as significant loss of contrast depending on the angle of view or deterioration in the picture quality such as reversal of the displayed image may occur. For this reason, a proposal to expand the viewing angle of a TN type liquid crystal display apparatus has been made by Toko, Kobayashi, et al. (Y. Toko, T. Sugiyama, K. Katoh, Y. Iimura, S. Kobayashi: SID 93 DIGEST, pp. 622–625 (1993)). According to the proposal, a liquid crystal cell is formed by injecting a chiral nematic liquid crystal into the cell while keeping a specified spacing without rubbing after forming the polyimide alignment film on a pair of electrodes. Switching of light by the application of voltage under parallel Nicol prisms or perpendicular Nicol prisms is made possible by setting the chiral pitch of the chiral nematic liquid crystal to four times the cell thickness.

However, the liquid crystal display cell fabricated without rubbing proposed by Toko et al. requires the injection into the cell of a liquid crystal in the isotropic phase, which leads to such drawbacks as the necessity of new facilities to heat the entire liquid crystal cell above the isotropic phase temperature during injection, thereby making the proposal impractical. In the case where a liquid crystal cell without rubbing is fabricated by employing the method of injecting the liquid crystal in nematic phase, which has been employed in the manufacture of TN liquid crystal display elements, the liquid crystal is only partially oriented because of the liquid crystal flow during injection resulting in a drawback of lack in homogeneity which can be recognized by unaided eyes. Further, in such liquid crystal cells which have partially oriented due to the liquid crystal cell during injection, the inhomogeneity cannot be completely eliminated even after keeping the cell in the isotropic phase for several hours.

Also in the case where a liquid crystal display cell is fabricated without rubbing, it is difficult to control the texture of the liquid crystal which is formed by cooling. Therefore, when observed in an oblique direction under crossed Nicol prisms, unevenness of the luminance sometimes becomes so large as to cover a plurality of pixels, causing the problem of appearing rough to the eye.

SUMMARY OF THE INVENTION

The liquid crystal display apparatus of the invention includes: a pair of substrates held at a distance; a pair of electrodes formed on inner opposing faces of the substrates, respectively; alignment films formed on the opposing faces so as to cover the pair of electrodes, respectively, the alignment films having capability to align a liquid crystal in horizontal orientation, and capability to align the liquid crystal in random orientation at a predetermined temperature or more; and a chiral nematic liquid crystal layer interposed between the pair of alignment films, the chiral nematic liquid crystal layer having a plurality of microscopic domains, each of the microscopic domains having the liquid crystal molecules aligned uniformly in the vicinity of the alignment films, the liquid crystal molecules in different microscopic regions being arranged in different directions with respect to one another.

In one embodiment of the invention, the alignment films include an organic polymer having a glass transition point in a range of 40° C. to 150° C., and the predetermined temperature is the glass transition point.

In another embodiment of the invention, the organic polymer has rubber elasticity at the predetermined temperature or more.

In still another embodiment of the invention, the organic polymer is a partially crystalline polymer.

In still another embodiment of the invention, the organic polymer is a crosslinked polymer.

In still another embodiment of the invention, the organic polymer is a polyurethane type compound.

In still another embodiment of the invention, the chiral nematic liquid crystal layer has a spontaneous helical pitch p, and the spontaneous helical pitch satisfies a following inequality:

$$0.25 \leq d/p < 1$$

where d is a thickness of the chiral nematic liquid crystal layer.

In still another embodiment of the invention, the liquid crystal display apparatus further includes a pair of polarizing means, absorbing axes of the pair of polarizing means are substantially perpendicular with each other.

According to another aspect of the invention, a method for producing a liquid crystal display apparatus is provided. The method includes the steps of: forming a pair of electrodes on respective inner faces of a pair of substrates; forming alignment films on the faces of the substrates so as to cover the electrodes, respectively, the alignment films having capability to align a liquid crystal in horizontal orientation and capability to align the liquid crystal in random orientation at a predetermined temperature or more; holding the substrates to oppose the alignment films without subjecting the alignment films to alignment treatment; injecting a liquid crystal having a chiral nematic phase between the substrates with the liquid crystal and the alignment films heated at a temperature which is a higher temperature of an NI point and the predetermined temperature; and cooling the liquid crystal and the alignment films so that the liquid crystal molecules form a plurality of microscopic domains, each of the microscopic domains having the liquid crystal molecules aligned uniformly in the vicinity of the alignment films, the liquid crystal molecules in different microscopic regions being arranged in different directions with respect to one another.

In one embodiment of the invention, the alignment films include an organic polymer having a glass transition point in a range of 40° C. to 150° C., and the predetermined temperature is the glass transition point.

In another embodiment of the invention, the organic polymer has rubber elasticity at the predetermined temperature or more.

In still another embodiment of the invention, the organic polymer is a partially crystalline polymer.

In still another embodiment of the invention, the organic polymer is a crosslinked polymer.

In still another embodiment of the invention, the organic polymer is a polyurethane type compound.

According to still another aspect of the invention, a liquid crystal display apparatus includes: a pair of substrates held at a distance; a pair of electrodes formed on opposing inner faces of the substrates respectively; alignment films formed on the opposing faces so as to cover the pair of electrodes, respectively, the alignment films having capability to align the liquid crystal in random orientation and having at least first surface regions and second surface regions, the second regions being chemically or physically different from the first surface regions; and a chiral nematic liquid crystal layer interposed between the pair of alignment films, the chiral nematic liquid crystal layer having a plurality of microscopic domains, each of the microscopic domains having the liquid crystal molecules aligned uniformly in the vicinity of the alignment films, the liquid crystal molecules in different microscopic regions being arranged in different directions with respect to one another.

In one embodiment of the invention, the chiral nematic liquid crystal layer has a spontaneous helical pitch p, and the spontaneous helical pitch satisfies a following inequality:

$$0.25 \leq d/p < 1$$

where d is a thickness of the chiral nematic liquid crystal layer.

In another embodiment of the invention, the chiral nematic liquid crystal layer has a birefringence $\Delta n$, and the birefringence satisfies a following inequality:

$$0.45 \text{ m} \leq \Delta n \times d < 1 \text{ m}$$

where d is a thickness of the chiral nematic liquid crystal layer.

In still another embodiment of the invention, the liquid crystal molecules aligned on the first surface regions have a different pre-tilt angle from the liquid crystal molecules aligned on the second surface regions.

In still another embodiment of the invention, the first surface region is positioned above the electrode and the second surface region is positioned above other than the electrode.

In still another embodiment of the invention, the liquid crystal molecules aligned on the first surface regions have a smaller pre-tilt angle than the liquid crystal molecules aligned on the second surface regions.

In still another embodiment of the invention, the liquid crystal display apparatus further includes an active device to drive the liquid crystal display apparatus.

According to still another aspect of the invention, a method for producing a liquid crystal display apparatus is provided. The method includes the steps of: (a) forming a pair of electrodes on respective inner faces of a pair of substrates; (b) forming alignment films on the faces of the substrates so as to cover the electrodes, respectively; (c) forming a first surface region and a second surface region at a surface of at least one of the alignment films; (d) holding the substrates to oppose the alignment films without subjecting the alignment films to alignment treatment; and (e) injecting a liquid crystal having a chiral nematic phase between the substrates with the liquid crystal and the alignment films heated at a temperature which is a higher temperature of an NI point and the predetermined temperature; and (f) cooling the liquid crystal and the alignment films so that the liquid crystal molecules form a plurality of microscopic domains, each of the microscopic domains having the liquid crystal molecules aligned uniformly in the vicinity of the alignment films, the liquid crystal molecules in different microscopic regions being arranged in different directions with respect to one another.

In one embodiment of the invention, step (c) includes the step of irradiating an active energy ray onto a part of the alignment film.

In still another embodiment of the invention, step (c) includes the step of removing a part of the alignment film.

The liquid crystal display apparatus of the invention is made by forming an alignment film, having the property of loosing the force which regulates the liquid crystal orientation above a particular temperature, on an electrode. With such a liquid crystal display apparatus, disturbance in the orientation due to the flow caused when the liquid crystal is injected between two electrodes at the room temperature can be eliminated by heating the same.

It is assumed that the disturbance in the orientation due to the liquid crystal flow is caused by the fact that the liquid crystal is adsorbed to the alignment film surface in the direction of flow, rendering some regularity to the surface of the alignment film. This anisotropy in the alignment film surface, once it is generated, cannot be eliminated even when the liquid crystal is heated above the NI point (nematic-isotropic point) of the liquid crystal, and remains as a disturbance in the orientation.

In the alignment film used in the liquid crystal display apparatus of the invention, however, molecular chains can move freely to a certain degree when heated above a particular temperature. And the liquid crystal material exhibits Brownian movement when the liquid crystal is heated above the NI point and changed into an isotropic liquid. When this happens, the anisotropy of the alignment film caused by the liquid crystal flow at the time the liquid crystal was injected between the electrodes is lost, resulting in random orientation of adjacent liquid crystal molecules. Consequently, the liquid crystal display apparatus of the invention does not include such unevenness that is observable with unaided eyes and is caused by disturbances in the orientation due to the flow.

Also the liquid crystal display apparatus of the invention utilizes random orientation which the liquid crystal molecules spontaneously take when the liquid crystal is cooled from above the NI point down to below the NI point. When the random state is observed in an oblique direction below crossed Nicol prisms, coarse luminance distribution may result in a rough appearance of the display to the eye. This problem can be solved by forming regions of different surface conditions on the alignment film surface, in order to render discontinuity between the regions of different surface conditions to the randomly oriented structure, thereby reducing the coarse luminance distribution and alleviate the rough appearance of display.

Thus, the invention described herein makes possible the advantages of (1) providing a liquid crystal display apparatus having a wide viewing angle without involving a significantly difficult process and (2) providing a liquid crystal display apparatus increasing the viewing angle without rough appearance to the eye.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of examples.

EXAMPLE 1

Figure 1:
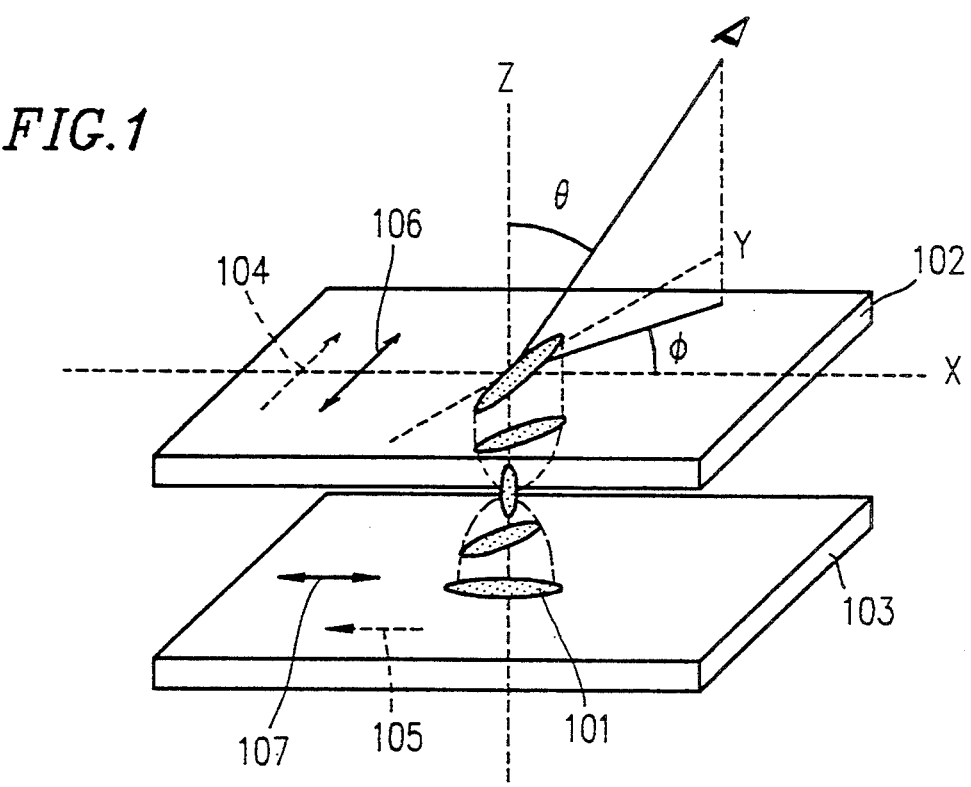
FIG. 1 is an explanatory view of the orientation of the liquid crystal in a twisted nematic type liquid crystal display apparatus.
Figure 2:
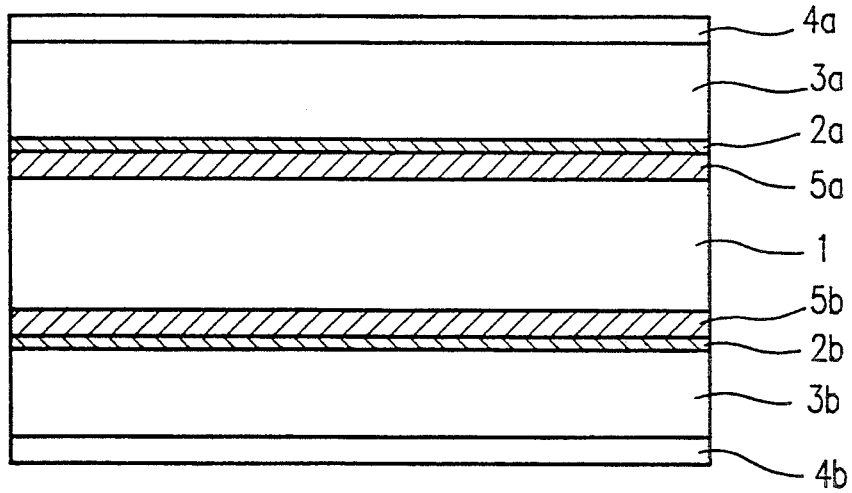
FIG. 2 is a sectional view of a liquid crystal display apparatus of the first example.

FIG. 2 is a cross sectional view of a liquid crystal display apparatus 10 of the invention. The liquid crystal display apparatus 10 has substrates 3a and 3b which have transparent electrodes 2a and 2b on the opposing surfaces thereof, and a liquid crystal layer 1 interposed between the substrates 3a and 3b. The liquid crystal display apparatus 10 has polarizers 4a and 4b on surfaces of the substrates 3a and 3b which do not oppose each other. The liquid crystal display apparatus 10 of the invention changes its transmissivity to light, which passes from the polarizer 4a through the liquid crystal layer 1 to the polarizer 4b, depending on the magnitude of the electric field applied to the liquid crystal layer 1 through the electrodes 2a and 2b similarly to the case of a liquid crystal display apparatus 10 of the prior art. It is preferred that the polarizers 4a and 4b are arranged so that the axes of absorption of the two polarizers 4a and 4b lie parallel or perpendicular to each other. More preferably, the axes of the absorption of the two polarizers 4a and 4b lie perpendicular to each other. The liquid crystal display apparatus 10 of the invention has organic polymer films 5a and 5b having glass transition points formed on the transparent electrode 2 of the substrates 3a and 3b.

The liquid crystal layer 1 includes a chiral nematic liquid crystal produced by adding a small amount of chirality agent to a nematic liquid crystal. For the nematic liquid crystal and the chirality agent, known materials used in twisted nematic (TN) liquid crystal display apparatuses and super-twisted nematic (STN) liquid crystal display apparatuses may be used. The chirality agent may be, for example, CB15, C15 made by BDH Co., Ltd., CN, R811, S811, R1011, S1011 made by E. Merck, CM-19, CM, CM-20, CM-21, CM-22 made by Chisso Co., Ltd. The ratio d/p of the thickness d of the liquid crystal layer 1 to the spontaneous helical pitch p of the chiral nematic liquid crystal is preferably from 0.1 to 1, and more preferably from 0.1 to 0.75, while 0.25 is the most preferable because it causes less coloration of the liquid crystal display apparatus.

The substrates 3a and 3b may be any material, provided that it is transparent to visible light. For example, the substrates 3a and 3b may be a known transparent material such as glass, acrylic resin and polycarbonate resin. The transparent electrodes 2a and 2b of tin oxide or ITO (indium-tin oxide) are formed on the substrates 3a and 3b by means of deposition, sputtering, CVD or the like. Over these surfaces, the organic polymer films 5a and 5b having glass transition points are formed.

While the organic polymer films 5a and 5b may be of any type, it preferably has a glass transition point in a range from 40° C. up to 150° C. A glass transition point below 40° C. is not preferable because the liquid crystal orientation changes while driving the liquid crystal display apparatus at room temperature. A glass transition point higher than 150° C., on the other hand, is not preferable because the liquid crystal, sealing resin or the like of the liquid crystal layer 1 experiences changes during the heating process at a temperature above the glass transition point for the purpose of eliminating disturbances in the orientation.

While the organic polymer films 5a and 5b may be either amorphous, crystalline or partially crystalline polymers, provided that the films show an elasticity of rubber above the glass transition point. The elasticity of rubber referred to here means the ability to be stretched by at least 100% and return to almost the initial size when the external force is terminated. Moreover, the organic polymer films 5a and 5b should be a partially crystalline polymer or a crosslinked polymer in order to fix the liquid crystal orientation at a temperature below the glass transition point. However, it is apparent that such a resin, which dissolves into the liquid crystal, is significantly colored is not suitable for the organic polymer films 5a and 5b.

For the organic polymer films 5a and 5b, polymethyl methacrylate, Poly(t-butylmethacrylate), polycarbonate, polycyclohexylmethacrylate, polyethyleneterephthalate, materials based on polyurethane, poly(2-hydroxyethylmethacrylate), poly(isobornylmethacrylate), polyvinylalcohol and cellulose polymer, copolymers of these materials, or those which are partially crosslinked may be used, provided that the glass transition point is in a range from 40° C. up to 150° C. Among the above-mentioned organic polymer films, it is preferable to employ materials based on polyurethane, and especially, partially crosslinked thermoplastic polyurethane.

Organic polymer films used for the invention must have the capability to align the liquid crystal in horizontal orientation. For example, organic polymer films having an alkyl chain or a trifluoromethyl group in the side chain can be used even though they are known as a film having a high pre-tilt angle. On the other hand, a film made of polysiloxane is not suitable for an organic film of the invention because the film aligns the liquid crystal in a perpendicular orientation.

Moreover, a mixture of the organic polymer mentioned above and materials known as a conventional alignment film may be used for the invention. In such a case, it is preferable that the mixture contains the above-mentioned organic polymer at 3% or more by weight.

The organic polymer films 5a and 5b are formed by applying the organic polymer in the form of a solution onto the substrates 3a and 3b having the transparent electrodes 2a and 2b, then removing the solvent. Coating with the organic polymer may be carried out by a known method such as spin coating, printing or dipping. The organic polymer film having a glass transition point formed on the substrate must be heated to remove the solvent. While the heating temperature varies depending on the kind of solvent, heating on a hot plate at 100° C. for one minute will suffice in the case in which N-methylpyrrolidone is used as the solvent. The thickness of the organic polymer films 5a and 5b is not limited, although the thickness is preferably within a range from 20 nm to 200 nm. A film thinner than 20 nm will not be capable of covering the entire surface uniformly, and a film thicker than 200 nm results in increased voltage drop by the film leading to poor display quality of the liquid crystal display apparatus.

The organic polymer films 5a and 5b are formed on the surfaces of the substrates 3a and 3b whereon the transparent electrodes 2a and 2b are formed. There may be an insulator layer being formed between the electrode and the alignment film to prevent the upper and lower substrates from shortcircuiting. The insulator layer may be made of any material, while silicon oxide and silicon nitride have better insulation performance and transparency.

The organic polymer films 5a and 5b which have been formed do not need an orientation process such as rubbing. The two substrates 3a and 3b, which have the organic polymer films 5a and 5b and the transparent electrodes 2a and 2b, are held to keep a proper space therebetween so that the organic polymer films 5a and 5b of the respective substrates oppose each other, and the liquid crystal layer 1 is interposed in the space. The liquid crystal layer 1 may be formed by a known method such as vacuum injection or liquid crystal dripping method. The two substrates are kept at a specified distance usually by arranging spherical particles made of glass or a synthetic resin between the substrates. It is preferable to bond the two substrates by means of an adhesive before or at the same time the liquid crystal is interposed therebetween. An epoxy resin is often used as the adhesive.

After injecting the liquid crystal between the substrates 3a and 3b as described above, the substrates 3a and 3b interposing the liquid crystal therebetween are kept at the NI point (nematic-isotropic point) of the liquid crystal or the glass transition point (Tg) of the organic polymer films 5a and 5b, whichever is higher. While the duration of time of keeping it at the temperature is not limited, about two hours may be sufficient in the case where a hot air drier is used. It is not desirable to keep the liquid crystal cell at a high temperature for too long a time, because it may cause part of the liquid crystal to decompose.

Because the organic polymer films 5a and 5b are not subjected to a rubbing treatment, the liquid crystal molecules adjacent to the organic polymer films 5a and 5b should be ideally aligned in a random direction having a predetermined pre-tilt angle. However, the liquid crystal molecules are actually adsorbed to the surface of the organic polymer films 5a and 5b in the direction into which the liquid crystal has been injected. The liquid crystal molecules are then aligned in random direction by keeping the liquid crystal cell at the NI point of the liquid crystal or the glass transition point of the organic polymer films 5a and 5b, whichever is higher. The regularity of the surface of the organic polymer films 5a and 5b caused by injection of the liquid crystal also disappear. After cooling down the liquid crystal cell to the room temperature, the liquid crystal has a plurality of microscopic domains. Each of the plurality of the microscopic domains in the vicinity of the organic polymer films 5a and 5b has the liquid crystal molecules aligned uniformly, and the liquid crystal molecules in different microscopic regions are arranged in different directions with respect to one another. Accordingly, in the liquid crystal display apparatus of the invention, disturbance in the orientation of the liquid crystal molecules disappears.

Specific embodiments of the invention will be described below.

(Example 1—1)

The transparent electrodes 2a and 2b made of ITO (indium-tin oxide) were formed on the entire surface of the substrates a 3a and 3b having an area of 5 cm×6 cm.

A nitrobenzene solution of polyethyleneterephthalate (made by Scientific Polymer Products Corp.) having glass transition point at 81° C. was applied onto the surfaces of the structure of the substrates 3a and 3b, having the transparent electrodes 2a and 2b, and dried thereby to form the organic polymer films 5a and 5b each 70 nm thick. The polyethyleneterephthalate in the form of a film 50 μm thick was stretched by 200% or greater at a temperature of glass transition point or higher, and showed the elasticity of rubber. This film also showed a peak in X-ray diffraction, indicating that it was partially crystallized.

The substrates 3a and 3b were arranged so that the organic polymer films 5a and 5b oppose each other. After sealing the periphery of the substrates 3a and 3b with epoxy resin, except for one portion while keeping the substrates 3a and 3b at a distance of 7.5 μm, a nematic liquid crystal (product name ZLI2419 made by E. Merck) having an NI point at 64° C. was sealed between the substrates by a vacuum injection process to form the liquid crystal cell having the liquid crystal layer 1. The liquid crystal injected in this process was one with a chirality agent (product name R811 made by E. Merck) added thereto to obtain a liquid crystal pitch of 30 μm. The liquid crystal cell was kept in a hot air drier at a temperature of 120° C. for one hour, then allowed to cool down at room temperature.

The liquid crystal cell was interposed between the two polarizers 4a and 4b which were arranged so that the polarization axes lie at right angles to each other, thereby to obtain the liquid crystal display apparatus 10.

When a square wave signal of 5 V at 60 Hz was applied to the liquid crystal display apparatus 10, light did not transmit through the electrodes, but did transmit through other portions. The contrast measured at pixels in a direction of 30° from the normal direction of the substrate 3a at a voltage of 5 V (60 Hz) showed a high value of 17/1.

(Example 1-2)

The transparent electrodes 2a and 2b made of ITO (indium-tin oxide) were formed on the entire surface of the substrates 3a and 3b having an area of 5 cm×6 cm.

Dimethylformamide solution of polycarbonate (made by Scientific Polymer Products Corp.) having a glass transition point at 150° C. and a mean molecular weight of 64,000 was applied onto the surfaces of the structure of the substrates 3a and 3b having the transparent electrodes 2a and 2b, and dried thereby to form the organic polymer films 5a and 5b each 70 nm thick. The polycarbonate in the form of a film 50 μm thick was stretched by 200% or greater at a temperature of glass transition point or higher, and showed the elasticity of rubber. This film also showed a peak in X-ray diffraction, indicating that it is partially crystallized.

The substrates 3a and 3b were arranged so that the organic polymer films 5a and 5b oppose each other. After sealing the periphery of the substrates 3a and 3b with epoxy resin, except for one portion while keeping the substrates 3a and 3b at a distance of 7.5 μm, a nematic liquid crystal (product name ZLI2419 made by E. Merck) having an NI point at 64° C. was sealed between the substrates by a vacuum injection process to form the liquid crystal cell having the liquid crystal layer 1. The liquid crystal injected in this process was one with a chirality agent (product name R811 made by E. Merck) added thereto to obtain a liquid crystal pitch of 30 μm. The liquid crystal cell was kept in a hot air drier at a temperature of 155° C. for one hour, then allowed to cool down at room temperature.

The liquid crystal cell was interposed between the two polarizers 4a and 4b which were arranged so that the polarization axes lie at right angles to each other, thereby to obtain the liquid crystal display apparatus 10.

When a square wave signal of 5 V at 60 Hz was applied to the liquid crystal display apparatus 10, light did not transmit through the electrodes, but did transmit through other portions. The contrast measured at pixels, in a direction of 30° from the normal direction of the substrate 3a at a voltage of 5 V (60 Hz), showed a high value of 18/1.

(Example 1-3)

The transparent electrodes 2a and 2b made of ITO (indium-tin oxide) were formed on the entire surface of the substrates 3a and 3b having an area of 5 cm×6 cm.

Dimethylformamide and an N-methylpyrrolidone solution of thermoplastic polyurethane resin (product name Diari MS5500 made by Mitsubishi Heavy Industries Ltd.) having a glass transition point at 55° C. was applied onto the surfaces of the structure of the substrates 3a and 3b having the transparent electrodes 2a and 2b, and dried thereby to form the organic polymer films 5a and 5b each 70 nm thick. The thermoplastic polyurethane in the form of a film 50 μm thick was stretched by 400% or greater at a temperature at the glass transition point or higher, and showed the elasticity of rubber. This film also showed a peak in X-ray diffraction, indicating that it was partially crystallized.

The substrates 3a and 3b were arranged so that the organic polymer films 5a and 5b oppose each other. After sealing the periphery of the substrates 3a and 3b with epoxy resin, except for one portion while keeping the substrates 3a and 3b at a distance of 7.5 μm, a nematic liquid crystal (product name ZLI2419 made by E. Merck) having an NI point at 64° C. was sealed between the substrates by a vacuum injection process to form the liquid crystal cell having the liquid crystal layer 1. The liquid crystal injected in this process was one with a chirality agent (product name R811 made by E. Merck) added thereto to obtain a liquid crystal pitch of 30 μm. The liquid crystal cell was kept in a hot air drier at a temperature of 80° C. for one hour, then allowed to cool down at room temperature.

The liquid crystal cell was interposed between the two polarizers 4a and 4b which were arranged so that the polarization axes lie at right angles to each other, thereby to obtain the liquid crystal display apparatus 10.

When a square wave signal of 5 V at 60 Hz was applied to the liquid crystal display apparatus 10, light did not transmit through the electrodes but did transmit through other portions. The contrast measured at pixels, in a direction of 30° from the normal direction of the substrate 3a at a voltage of 5 V (60 Hz), showed a high value of 19/1.

(Example 1-4)

The transparent electrodes 2a and 2b made of ITO (indium-tin oxide) were formed on the entire surface of the substrates 3a and 3b having an area of 5 cm×6 cm.

An N-methylpyrrolidone solution of thermoplastic polyurethane resin (product name Diari MS5500 made by Mitsubishi Heavy Industries Ltd.) having a glass transition point at 81° C. and polyimide (product name AL5417 made by Japan Synthetic Rubber Co., Ltd.) was applied onto the surfaces of the structure of the substrates 3a and 3b having the transparent electrodes 2a and 2b, and dried thereby to form the organic polymer films 5a and 5b each 70 nm thick. The thermoplastic polyurethane is added to the polyimide by a weight ratio of 1:9.

The substrates 3a and 3b were arranged so that the organic polymer films 5a and 5b oppose each other. After sealing the periphery of the substrates 3a and 3b with epoxy resin, except for one portion while keeping the substrates 3a and 3b at a distance of 7.5 μm, a nematic liquid crystal (product name ZLI2419 made by E. Merck) having an NI point at 64° C. was sealed between the substrates by a vacuum injection process to form the liquid crystal cell having the liquid crystal layer 1. The liquid crystal injected in this process was one with a chirality agent (product name R811 made by E. Merck) added thereto to obtain a liquid crystal pitch of 30 μm. The liquid crystal cell was kept in a hot air drier at a temperature of 80° C. for one hour, then allowed to cool down at room temperature.

The liquid crystal cell was interposed between the two polarizers 4a and 4b which were arranged so that the polarization axes lie at right angles to each other, thereby to obtain the liquid crystal display apparatus 10.

When a square wave signal of 5 V at 60 Hz was applied to the liquid crystal display apparatus 10, light did not transmit through the electrodes, but did transmit through other portions. The contrast measured at pixels, in a direction of 30° from the normal direction of the substrate 3a at a voltage of 5 V (60 Hz), showed a high value of 17/1.

(Example 1-5)

The transparent electrodes 2a and 2b made of ITO (indium-tin oxide) were formed on the entire surface of the substrates 3a and 3b having an area of 5 cm×6 cm.

An N-methylpyrrolidone solution of partially cross-linked urethane resin (product name Texin 192A made by Mobay Chemical Co., Ltd.) having glass transition point at 82° C. was applied onto the surfaces of the structure of the substrates 3a and 3b having the transparent electrodes 2a and 2b, and dried thereby to form the organic polymer films 5a and 5b each 70 nm thick. The thermoplastic polyurethane in the form of a film 50 μm thick was stretched by 400% or greater at a temperature of glass transition point or higher, and showed the elasticity of rubber.. This film also showed a peak in X-ray diffraction, indicating that it was partially crystallized.

The substrates 3a and 3b were arranged so that the organic polymer films 5a and 5b oppose each other. After sealing the periphery of the substrates 3a and 3b with epoxy resin, except for one portion while keeping the substrates 3a and 3b at a distance of 7.5 μm, a nematic liquid crystal (product name ZLI2419 made by E. Merck) having an NI point at 64° C. was sealed between the substrates by a vacuum injection process to form the liquid crystal cell having the liquid crystal layer 1. The liquid crystal injected in this process was one with a chirality agent (product name R811 made by E. Merck) added thereto to obtain a liquid crystal pitch of 30 m. The liquid crystal cell was kept in a hot air drier at a temperature of 100° C. for one hour, then allowed to cool down at room temperature.

The liquid crystal cell was interposed between the two polarizers 4a and 4b, which were arranged so that the polarization axes lie at right angles to each other, thereby to obtain the liquid crystal display apparatus 10.

When a square wave signal of 5 V at 60 Hz was applied to the liquid crystal display apparatus 10, light did not transmit through the electrodes, but did transmit through other portions. The contrast measured at pixels, in a direction of 30° from the normal direction of the substrate 3a at a voltage of 5 V (60 Hz), showed a high value of 18/1.

(Example 1-6)

Figure 3:
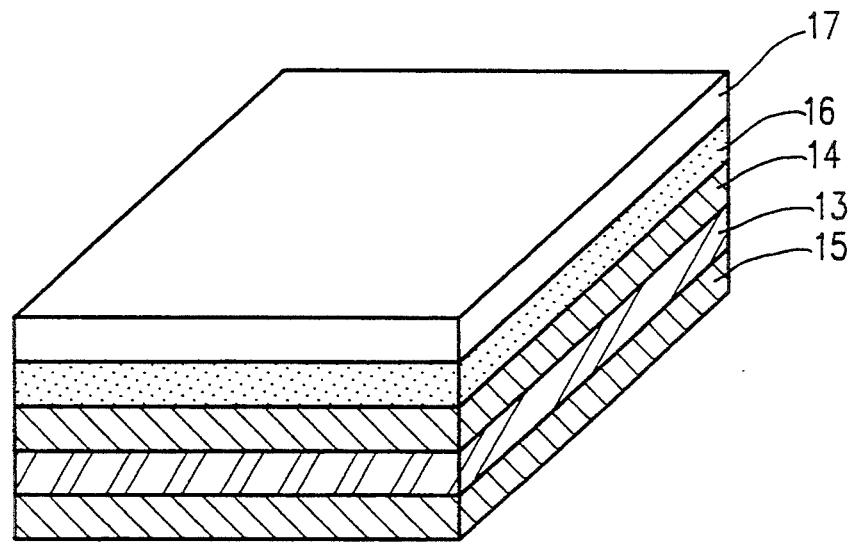
FIG. 3 is a perspective view illustrating a polarizer-integrated type substrate which can be used in the liquid crystal display apparatus of the first example.

A polarizer-integrated substrate was used instead of the glass substrates 3a and 3b of the embodiment 1-3. Specifically, as is shown in FIG. 3, a polarizer-integrated substrate having a polarizer 13, polyethersulphon films 14 and 15 arranged to interpose the polarizer 13, an undercoat layer 16 provided on the polyethersulphon films 14 and a transparent electrode (ITO) layer 17 formed on the undercoat layer 16 were used. For such a polarizer-integrated substrate, CST-7100 made by Sumitomo Bakelite Co., Ltd., for example, may be used. The polyethersulphon films 14 and 15 have optical isotropy. The polarizer 13, the polyethersulphon films 14 and 15, and the undercoat layer 16 correspond to the substrates 3a and the polarizer 4a, or the substrates 3b and the polarizer 4b shown in FIG. 2.

When such a substrate is used, the transparent electrode (ITO) layer 17 can be formed into a desired configuration to make transparent electrodes 2a and 2b.

Similarly to the example 1-3, the organic polymer layer 5a or 5b, shown in FIG. 2, was installed to cover the undercoat layer 16 whereon the transparent electrode (ITO) layer 17 was partially formed, thereby to obtain a liquid crystal display apparatus.

When a square wave signal of 5 V at 60 Hz was applied to the liquid crystal display apparatus, light did not transmit through the electrodes, but did transmit through other portions.

(Comparative example 1—1)

Instead of the organic polymer film used in the example 1—1, an N-methylpyrrolidone solution of polyimide varnish (product name LQ-S100 made by Hitachi Chemical Co., Ltd.) having glass transition point at 266° C. was applied. After evaporating the solvent by means of a hot plate, the film was left to harden at 250° C. for one hour, thereby forming a polyimide film 70 nm thick and making a liquid crystal display apparatus. When heated to 280° C., the film turned black and decomposed, therefore it was considered to have no elasticity of rubber. After injecting the liquid crystal, the liquid cell was not kept at a high temperature.

When a square wave signal of 5 V at 60 Hz was applied to the liquid crystal display apparatus, light did not transmit through the electrodes but transmitted through other portions. However, streaks along the flow of the liquid crystal during injection whether the voltage was OFF or ON. Consequently, the liquid crystal was colored along the streak when the voltage was OFF, and uniformly black display was not obtained when the voltage was ON.

(Comparative example 1-2)

Instead of the organic polymer film used in the example 1—1, an N-methylpyrrolidone solution of polyimide varnish (product name LQ-S100 made by Hitachi Chemical Co., Ltd.) having a glass transition point at 266° C. was applied. After evaporating the solvent by means of a hot plate, the film-was left to harden at 250° C. for one hour, thereby forming a polyimide film 70 nm thick and making a liquid crystal display apparatus. After injecting the liquid crystal, the liquid cell was kept in a hot air drier at a temperature of 80° C. for one hour, then allowed to cool down at room temperature.

When a square wave signal of 5 V at 60 Hz was applied to the liquid crystal display apparatus, light did not transmit through the electrodes, but did transmit through other portions. However, streaks along the flow of the liquid crystal during injection whether the voltage was OFF or ON. Consequently, uniformly black display was not obtained when the voltage was ON.

(Comparative example 1-3)

Instead of the organic polymer film used in the example 1—1, an N-methylpyrrolidone solution of polyimide varnish (product name LQ-S100 made by Hitachi Chemical Co., Ltd.) having a glass transition point at 266° C. was applied. After evaporating the solvent by means of a hot plate, the film was left to harden at 250° C. for one hour, thereby forming a polyimide film 70 nm thick and a liquid crystal display apparatus was made.

After injecting the liquid crystal, the liquid cell was kept in a hot air drier at a temperature of 280° C. for one hour, and the liquid crystal cell broke with the liquid crystal scattering to the outside, unable to fabricate a liquid cell.

The liquid crystal cells obtained in the embodiments 1—1 through 1-5 and comparative examples 1—1 and 1-2 were compared by studying the orientation of each liquid crystal. Orientation was checked to see whether orientation defect is found or not by visual observation with no voltage being applied. Results are shown in Table 1.

The liquid crystal display apparatus of the invention made by using an organic polymer film having a glass transition point in a range from 40° C. up to 150° C. or an organic polymer film which shows the elasticity of rubber at temperatures above the glass transition point has good liquid orientation and shows no non-uniformity in the liquid crystal orientation in the direction of flow which may be caused by liquid crystal injection.

TABLE 1

|  | Glass transition point (°C.) | Rubber elasticity | Appearance of display |
| --- | --- | --- | --- |
| Example 1-1 | 81 | Yes | Uniform |
| Example 1-2 | 150 | Yes | Uniform |
| Example 1-3 | 55 | Yes | Uniform |
| Example 1-4 |  | No | Uniform |
| Example 1-5 | 82 | Yes | Uniform |
| Comparative Example 1-1 | 266 | No | Remarkable disturbance |
| Comparative Example 1-2 | 266 | No | Disturbance |

Example 2

Another example of the invention will be described below with reference to the drawings.

(Example 2-1)

Figure 4:
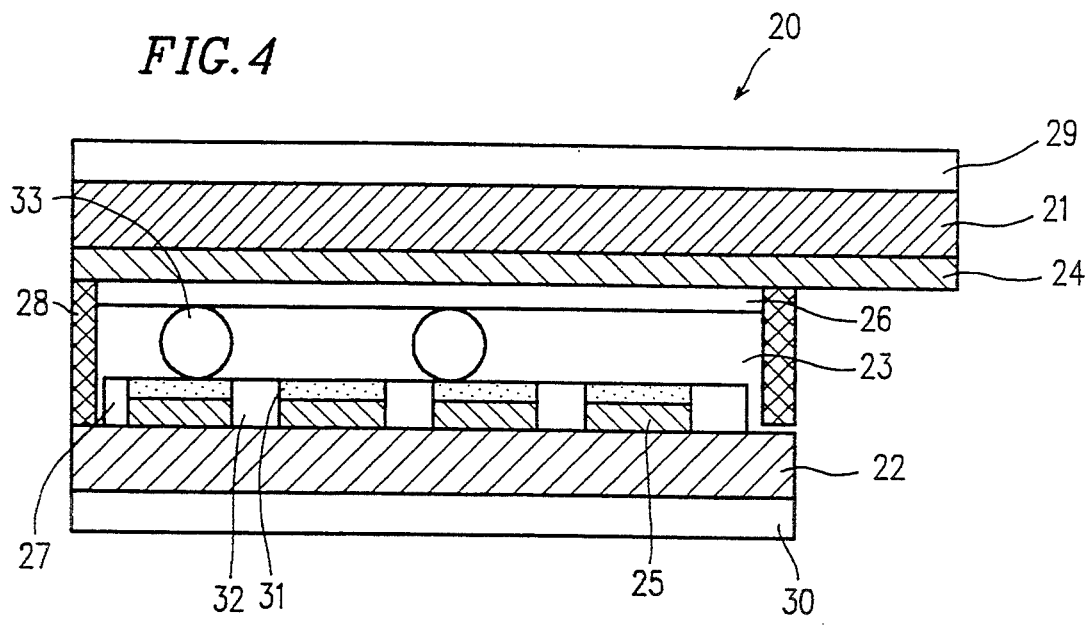
FIG. 4 is a sectional view of a liquid crystal display apparatus of the second example of the invention.

A liquid crystal display apparatus 20 of the second example of the invention will be described below with reference to FIG. 4.

The liquid crystal display apparatus 20 has an upper glass substrate 21, a lower glass substrate 22 and a chiral nematic liquid crystal layer 23 interposed between the two substrates. On opposing surfaces of the upper glass substrate 21 and the lower glass substrate 22, segment electrodes 24 and common electrodes 25 are formed, respectively. The segment electrodes 24 and common electrodes 25 are strip shapes having a width of 80 μm, and the segment electrodes 24 elongate in the direction perpendicular to the direction in which the common electrodes 25 elongate. Therefore, transverse cross sections of the common electrodes 25 and longitudinal cross section of the segment electrodes 24 are shown in FIG. 4.

Polyimide films 26 and 27 are formed on the upper glass substrate 21 and the lower glass substrate 22 in such a manner as to cover the segment electrodes 24 and the common electrodes 25.

The upper glass substrate 21 and the lower glass substrate 22 are kept at such a distance as to hold the liquid crystal layer 23 by a spacer 33, and the liquid crystal layer 23 is sealed by a sealant 28. The upper glass substrate 21 and the lower glass substrate 22 have polarizers 29 and 30 attached on the surfaces thereof which do not oppose each other.

The polyimide films 26 and 27 are not processed by rubbing. The polyimide films 26 and 27 also have ultraviolet-irradiated regions 31 and ultraviolet non-irradiated regions 32. The ultraviolet irradiated regions 31 of the polyimide films 26 and 27 have chemical and physical properties different from those of the ultraviolet non-irradiated regions 32 such that polyimide is oxidized by ultraviolet ray or side chains of the molecule is cut off. Therefore, the pre-tilt angle of the liquid crystal molecules in contact with the ultraviolet-irradiated regions 31 is different from the pre-tilt angle of the liquid crystal molecules in contact with the ultraviolet non-irradiated regions 32. As a result, the surface conditions for orientation of the liquid crystal molecules discontinues at the boundaries between the ultraviolet-irradiated regions 31 and the ultraviolet non-irradiated regions 32. Domains formed in the liquid crystal layer are therefore made to be small by the discontinuity of the orientation, which reduces rough appearance of the liquid crystal display to the eye. Such a discontinuity of the orientation of the liquid crystal molecules is so effective to reduce rough appearance to the eye, as long as such a discontinuity of the orientation of the liquid crystal molecules is provided on at least one polyimide film.

The liquid crystal display apparatus 20 is fabricated in the following processes.

First, an ITO (indium-tin oxide) film having sheet resistance of about 30 Ω/sq. formed on the upper glass substrate 21 is patterned by photolithography, to obtain the segment electrodes 24 comprising 64 stripes. The common electrodes 25 comprising 64 stripes are also formed on the lower glass substrate 22 in a similar process. The segment electrode and the common electrode are arranged to lie perpendicular to each other. The polyimide films 26 and 27 each 80 nm thick are formed in a printing process on such glass substrates 21 and 22 as described above. RN-7511 (Nissan Chemical Industries Ltd.) are used for the thin polyimide film of this example. The thin polyimide film has a function to align the liquid crystal molecules in an orientation at a pre-tilt angle near the normal direction of the glass substrate surface. Then after forming a mask pattern (not shown in the drawing), having an aperture only at a position where the common electrodes 25 are located, on the polyimide film 27, the polyimide film 27 was irradiated with the light of a high-pressure mercury lamp through a mask pattern for five minutes. Intensity of light at the irradiated surface was 40 mW/cm². On the irradiated polyimide film, the liquid crystal molecules are aligned in orientation parallel or at a slight pre-tilt angle to the substrate.

Similarly, such a mask pattern (not shown in the drawing), that has an aperture only at a position where the segment electrodes 24 are located, was formed on the polyimide film 26 of the upper glass substrate 21, then the polyimide film 26 was irradiated with the light of the high-pressure mercury lamp through a mask pattern for five minutes. Intensity of light at the irradiated surface was 40 mW/cm².

Spherical spacers 33 made of a plastic 5 μm in diameter (Micro-pearl made by Sekisui Fine Co., Ltd.) were uniformly dispersed over the lower glass substrate 22. A thermosetting sealant 28 (Struct-bond made by Mitsui Toatsu Chemicals, Inc.) was formed by printing on the periphery of the upper glass substrate 21 leaving an inlet for liquid crystal injection. The upper and lower glass substrates 21 and 22 were placed one on another and bonded so that the segment electrodes 24 and the common electrodes 25 lie perpendicular to each other, and the sealant 28 was let to harden completely at a specified temperature.

Then a chirality material having right-handed twisting property (R-1011 made by E. Merck) was added to a nematic liquid crystal having anisotropy in index of refraction Δn of 0.134, and the concentration was controlled to make the ratio of the cell gap d to the spontaneous twisting pitch p to d/p=0.25. Birefringence Δn and the cell gap d preferably satisfy an inequality $$0.45 \mu m \leq \Delta n \times d < 1 \mu m.$$

The chiral nematic liquid crystal fabricated under such conditions as described above was heated to turn the liquid crystal isotropic, then the liquid crystal was injected into the space between the glass substrates 21 and 22 by vacuum injection method. At this time, the glass substrates 21 and 22 are also heated to a temperature above the nematic-isotropic phase transition temperature (NI point) of the chiral nematic liquid crystal. After forming the chiral nematic liquid crystal layer 23, the liquid crystal cell was gradually cooled down and the inlet for liquid crystal injection was sealed with a sealing resin.

In the liquid crystal display apparatus 20 fabricated as described above, because the pre-tilt angle of the liquid crystal molecules differs between the ultraviolet-irradiated region and ultraviolet non-irradiated region, such a large liquid crystal domain is not formed as extending between the ultraviolet-irradiated region and ultraviolet non-irradiated region.

As a result, a liquid crystal display apparatus having good display quality is obtained with the rough appearance of display being alleviated. Measurement of the contrast at pixel in a direction 30° from the normal direction of the substrate at 5 V (60 Hz) showed a value as high as 20/1.

The finer the liquid crystal domain, the less the rough appearance of the display becomes. Therefore it is preferable that both the ultraviolet-irradiated region and the ultraviolet non-irradiated region are smaller. Specifically, it is preferable that either region is not greater than 50 μm×50 μm. In order to form such microscopic regions, it is preferable that the mask pattern, used in the irradiation of ultraviolet light, has an aperture smaller than the segment electrodes 24 or the common electrodes 25. However, because domains measuring from several hundred micrometers to several millimeters are usually formed when a liquid crystal layer makes contact with a material which has not been subjected to orientation process, rough appearance of display can be greatly alleviated when ultraviolet-irradiated regions and ultraviolet non-irradiated regions are formed by using a mask pattern having an aperture of comparative size as the segment electrodes 24 or the common electrodes 25.

In the case where a shielding film provided between the segment electrodes 24 and between the common electrodes 25, and is capable of shielding the ultraviolet light enough, the ultraviolet-irradiated regions and the ultraviolet non-irradiated regions can be formed on the polyimide films 26 and 27 by irradiating the films with ultraviolet light from the upper and lower glass substrates 21 and 22 sides with the shielding film as a mask. Such a method simplifies the manufacturing process.

In order to verify the effect of the invention, a liquid crystal display apparatus having polyimide film without the ultraviolet-irradiated region formed thereon was fabricated by using PSI-A-2201 (made by Chisso Co., Ltd.) as the thin polyimide film.

Figure 5:
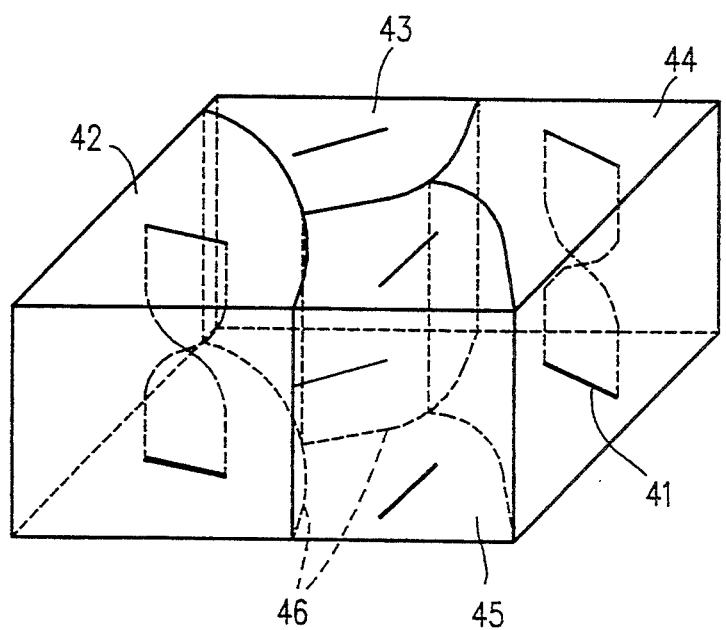
FIG. 5 is a view illustrating the orientation of the liquid crystal layer generated in a liquid crystal display apparatus of a comparative example for the second example.

FIG. 5 is an oblique view drawing illustrative of the microscopic orientation in the pixel at an OFF voltage when the liquid crystal display apparatus is driven with ¼ duty. In FIG. 5, thick line 41 represents the major axis of a liquid crystal molecule (director). A plurality of domains 42, 43, 44, 45 having different directors in the glass substrate interface exist, and disclination lines 46 were observed caused by the difference in the directions of directors between domains. In an ordinary liquid crystal display apparatus, only one domain having a single direction of director exists in a pixel, because the thin polyimide film has been rubbed. However, because the thin polyimide film has not been rubbed in this example, the liquid crystal molecules are put into orientation in a state similar to amorphous material by the intermolecular force, generating a plurality of domains. In each domain, the liquid crystal molecules show a state of orientation with a twist corresponding to the preset value of d/p between the upper and lower substrates. In the case of this comparative example, because the d/p is set to 0.25, the liquid crystal molecules show an orientation twisted 90° between the upper and lower substrates. In this case, it is presumed that the incident light exits from the liquid crystal layer being elliptically polarized by the birefringent effect of the liquid crystal layer.

When an ON voltage is applied, the liquid crystal molecules in each domain turn from the twisted orientation to splay orientation, and therefore clear disclination lines accompanying deformation appear in the liquid crystal layer (bulk). In the domain, the liquid crystal molecules are aligned in such an orientation so that the director is parallel to the direction of the electric field, and so that the incident light transmits through the liquid crystal layer in almost linearly polarized state, and is cut by the exit polarizer to create dark state. However, the clear disclination does not disappear completely.

When the liquid crystal display apparatus in this state is viewed in an oblique direction, the difference in the direction of the director among domains causes a slight difference in the transmitted light intensity, resulting in a rough appearance of display. The contrast measured at pixel in a direction of 30° from the normal direction of the substrate at a voltage of 5 V which gives a strong rough appearance to the eye.

(Example 2-2)

Figure 6:
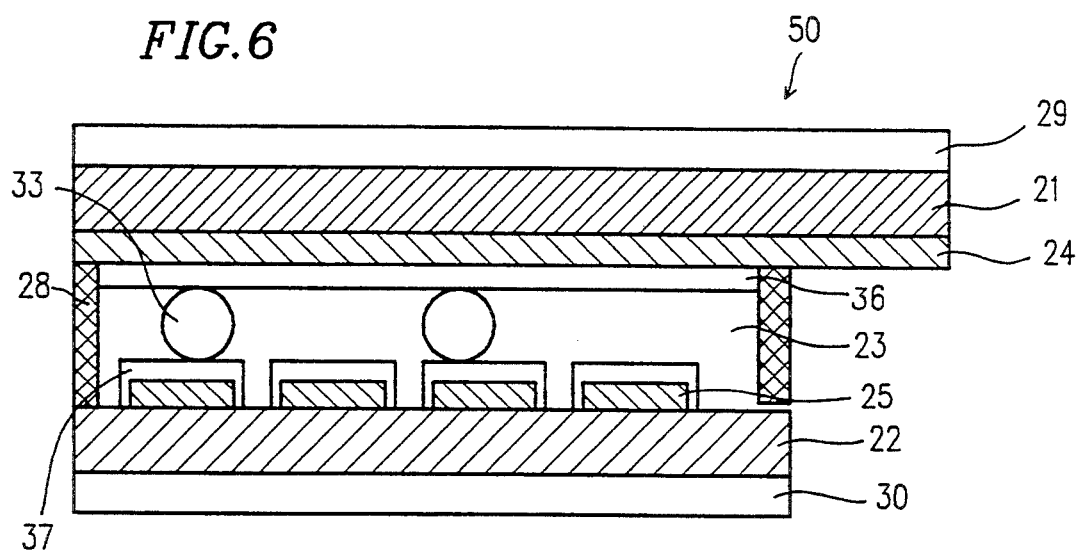
FIG. 6 is a sectional view of another liquid crystal display apparatus of the second example of the invention.

A liquid crystal display apparatus 50 shown in FIG. 6 has positive photoresist films 36 and 37 instead of the polyimide films 26 and 27 of the liquid crystal display apparatus 20 of the example 2-1. The other components are the same as those of the liquid crystal display apparatus 20, and therefore description thereof will be omitted while detailed description will be given to the positive photoresist films 36 and 37.

The upper and lower glass substrates 21 and 22 with the segment electrode 24 and the common electrode 25 were formed, respectively, thereon and were coated with a positive photoresist based on novolac resin (made by Tokyo Ohka Kogyo Co., Ltd.) by a method similar to the example 2-1 so as to form photoresist films having a thickness of 2 μm, and were dried in an oven at 160° C. for 30 minutes. Then the positive photoresist film was irradiated with the light of a high-pressure mercury lamp for five minutes via a light-intercepting mask intercepting the light only at the portions of the electrodes. Intensity of radiation at the irradiated surface was 100 mW/cm$^2$. After irradiation, exposed portions (namely the resist film in portions other than the electrodes) were dissolved and removed by using a weakly alkaline developer solution to form positive films 36 and 37 on the glass substrates 21 and 22, respectively.

In the liquid crystal display apparatus obtained as described above, continuity of the liquid crystal orientation was broken between a portion with the resist and a portion without the resist and, as a result, disclination in the intermediate tone regions was hardly observed showing a high quality of display with reduced rough appearance. The contrast measured at pixel in a direction of 30° from the normal direction of the substrate at a voltage of 5 V showed a value as high as 21/1.

(Example 2-3)

Figure 7:
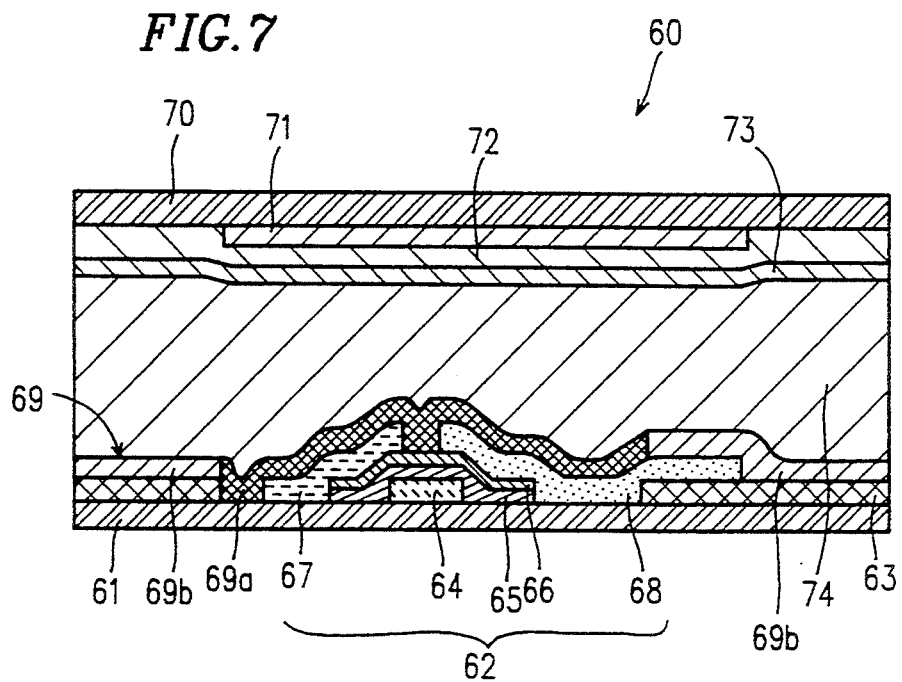
FIG. 7 is a sectional view of still further another liquid crystal display apparatus of the second example of the invention.

FIG. 7 is a sectional drawing explanatory of a so-called active liquid crystal display apparatus 60 provided with a thin film transistor (referred to as TFT hereafter) for each pixel of the liquid crystal display apparatus described in the example 2-1.

The lower glass substrate 61 is provided with a TFT 62 and a pixel electrode 63 formed thereon. The TFT 62 has a gate electrode 64, a gate insulator film 65, an amorphous silicon layer 66, a source electrode 67 and a drain electrode 68. The drain electrode 68 is connected to the pixel electrode 63. An alignment film 69 is formed on the lower glass substrate 61 in such a manner as to cover the TFT 62 and the pixel electrode 63. The alignment film 69 includes an ultraviolet-irradiated region 69b and an ultraviolet non-irradiated region 69a.

On the other hand, an upper glass electrode 70 is provided with a light intercepting layer 71, and a common electrode 72 is provided on the upper glass substrate 70 to cover the light intercepting layer 71. Further an alignment film 73 is provided over the entire surface of the upper glass electrode 70 to cover the common electrode 72. A polymer/liquid crystal composite layer 74 is interposed between the upper glass electrode 70 and the lower glass electrode 61.

NOW the process of manufacturing the liquid crystal display apparatus 60 will be briefly described below. First, a chrome layer is formed on the lower glass substrate 61 by electron beam deposition, and the gate electrode 64 is formed by photo-etching. Then the gate insulator film 65, made of silicon nitride 200 nm thick, is formed by plasma CVD method, over which an amorphous silicon layer 66 having a thickness of 60 nm is formed by the plasma CVD method which is then processed into a desired shape by photo-etching. Then a chrome layer is formed over the entire surface by sputtering from which the drain electrode 68 and the source electrode 67 were formed by photo-etching. This is followed by the formation of an ITO film all over the surface by sputtering, thereby forming the pixel electrode 63 having a pixel pitch of 80 μm×50 μm by photo-etching. A thin polyimide film of RN-7511 (Nissan Chemical Industries Ltd.) covering the entire surface is formed. The thin polyimide film has the function to align the liquid crystal molecules in an orientation at a pre-tilt angle near the normal direction of the glass substrate surface.

Then a mask pattern having an aperture only at a position where the pixel electrode 69b is located and formed on the alignment film 69, and the alignment film 69 is irradiated with the light of a high-pressure mercury lamp through the mask pattern for five minutes. Intensity of light at the irradiated surface was 40 mW/cm$^2$. The ultraviolet-irradiated region 69b and the ultraviolet non-irradiated region 69a are thus formed.

On the other hand, a light intercepting layer 71 made of chrome is formed in a portion opposing the TFT 62 on the upper glass substrate 70 and the common electrode 72 made of ITO is formed over the entire surface. This is followed by the application of nylon-6 to a thickness of 50 nm. On the upper glass substrate 70, an acid anhydride-hardening type epoxy resin, with glass fibers 5 μm in diameter dispersed therein, is printed in a width of 0.2 mm along the perimeter except for one edge where a space 5 mm wide is left at the center of the edge. With resin balls 5 μm in diameter dispersed on the lower glass substrate 61, the two glass substrates are pressed against each other with the ITO electrode surfaces thereof facing inward, and heated at 150° C. for two hours to harden and bond, thereby fabricating an empty cell. A chiral nematic liquid crystal is prepared by adding a chirality agent to a nematic liquid crystal similar to that of the example 1 so that the d/p becomes 0.25, and the chiral nematic liquid crystal is injected at 120° C., a temperature above the NI point, to fabricate the liquid crystal display apparatus. The display is completed by attaching two polarizers on the front and back of the liquid crystal display apparatus so that the axes of absorption lay perpendicular to each other.

In the TFT-driven liquid crystal display apparatus obtained as described above, continuity of the liquid crystal orientation is broken between a portion irradiated with ultraviolet light and a portion not irradiated and, as a result, disclination in the intermediate tone regions is hardly observed showing a high quality of display with the rough appearance being alleviated. The contrast measured at a pixel in a direction of 30° from the normal direction of the substrate at a voltage of 5 V (60 Hz) showed a value as high as 25/1.

Although transmission type liquid crystal display apparatuses are taken as examples in the above description of the invention, the invention is not limited to the transmission type and provides high quality of display when applied to a liquid crystal display apparatus of reflection type by providing a reflector on the surface of one polarizer. Although such examples are described in the above embodiments as breaking the continuity in each pixel without specifying a region where the surface condition is changed, the structure can be made even finer by forming regions of different surface conditions in the electrode. Also because the rubbing process is not necessary, a decrease in the yield of production due to rubbing can be prevented, having a great effect of reducing the manufacturing process.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display apparatus comprising:
   a pair of substrates held at a distance;
   a pair of electrodes formed on opposing inner faces of the substrates, respectively;
   alignment films formed on the opposing inner faces to cover the pair of electrodes, respectively, the alignment films having capability to align a liquid crystal in a horizontal orientation and capability to align the liquid crystal in a random orientation at a predetermined temperature or higher; and
   a chiral nematic liquid crystal layer interposed between the pair of alignment films, the chiral nematic liquid crystal layer having a plurality of microscopic domains, each of the microscopic domains having the liquid crystal molecules aligned uniformly in the vicinity of the alignment films, the liquid crystal molecules in different microscopic regions being arranged in different directions with respect to one another.

2. A liquid crystal display apparatus according to claim 1, wherein the alignment films include an organic polymer having a glass transition point in a range of 40° C. to 150° C., and the predetermined temperature is the glass transition point.

3. A liquid crystal display apparatus according to claim 2, wherein the organic polymer has rubber elasticity at the predetermined temperature or higher.

4. A liquid crystal display apparatus according to claim 3, wherein the organic polymer is a partially crystalline polymer.

5. A liquid crystal display apparatus according to claim 3, wherein the organic polymer is a crosslinked polymer.

6. A liquid crystal display apparatus according to claim 3, wherein the organic polymer is a polyurethane type compound.

7. A liquid crystal display apparatus according to claim 1, wherein the chiral nematic liquid crystal layer has a spontaneous helical pitch p, and the spontaneous helical pitch satisfies a following inequality:

$$0.25 \leq d/p < 1$$

where d is a thickness of the chiral nematic liquid crystal layer.

8. A liquid crystal display apparatus according to claim 1, further comprising a pair of polarizing means formed on outer faces of the substrates, wherein absorbing axes of the pair of polarizing means are substantially perpendicular with each other.

9. A method for producing a liquid crystal display apparatus, comprising the steps of:
   forming a pair of electrodes on respective inner faces of a pair of substrates;
   forming alignment films on the inner faces of the substrates to cover the electrodes, respectively, the alignment films having capability to align a liquid crystal in a horizontal orientation and capability to align the liquid crystal in a random orientation at a predetermined temperature or higher;
   holding the substrates to oppose the alignment films, and without subjecting the alignment films to alignment treatment;
   injecting a liquid crystal having a chiral nematic phase between the substrates with the liquid crystal and the alignment films heated at a temperature which is a higher temperature of an NI point and the predetermined temperature; and
   cooling the liquid crystal and the alignment films so that the liquid crystal molecules form a plurality of microscopic domains, each of the microscopic domains having liquid crystal molecules aligned uniformly in a vicinity of the alignment films, the liquid crystal molecules in different microscopic regions being arranged in different directions with respect to one another.

10. A method according to claim 9, wherein the alignment films comprise an organic polymer having a glass transition point in a range of 40° C. to 150° C., and the predetermined temperature is the glass transition point.

11. A method according to claim 10, wherein the organic polymer has rubber elasticity at the predetermined temperature or higher.

12. A method according to claim 10, wherein the organic polymer is a partially crystalline polymer.

13. A method according to claim 10, wherein the organic polymer is a crosslinked polymer.

14. A method according to claim 10, wherein the organic polymer is a polyurethane type compound.

15. A liquid crystal display apparatus comprising:
   a pair of substrates held at a distance;
   a pair of electrodes formed on opposing inner faces of the substrates respectively;

alignment films formed on the opposing inner faces to cover the pair of electrodes, respectively, the alignment films having capability to align the liquid crystal in a random orientation and having at least first surface regions and second surface regions, the second regions being chemically or physically different from the first surface regions; and a chiral nematic liquid crystal layer interposed between the pair of alignment films, the chiral nematic liquid crystal layer having a plurality of microscopic domains, each of the microscopic domains having the liquid crystal molecules aligned uniformly in the vicinity of the alignment films, the liquid crystal molecules in different microscopic regions being arranged in different directions with respect to one another.

16. A liquid crystal display apparatus according to claim 15, wherein the chiral nematic liquid crystal layer has a spontaneous helical pitch p, and the spontaneous helical pitch satisfies a following inequality:

$$0.25 \leq d/p < 1$$

where d is a thickness of the chiral nematic liquid crystal layer.

17. A liquid crystal display apparatus according to claim 15, wherein the chiral nematic liquid crystal layer has a birefringence $\Delta n$, and the birefringence satisfies a following inequality:

$$0.45 \ \mu m \leq \Delta n \times d < 1 \ \mu m.$$

where d is a thickness of the chiral nematic liquid crystal layer.

18. A liquid crystal display apparatus according to claim 15, wherein the liquid crystal molecules aligned on the first surface regions have a different pre-tilt angle from that liquid crystal molecules aligned on the second surface regions.

19. A liquid crystal display apparatus according to claim 15, wherein the first surface regions are positioned above one of the electrodes and the second surface regions are positioned above one of the substrates.

20. A liquid crystal display apparatus according to claim 19, wherein the liquid crystal molecules aligned on the first surface regions have a smaller pre-tilt angle than the liquid crystal molecules aligned on the second surface regions.

21. A liquid crystal display apparatus according to claim 15, further comprising a active device to drive the liquid crystal display apparatus.

22. A method for producing a liquid crystal display apparatus, comprising the steps of:
 (a) forming a pair of electrodes on respective inner faces of a pair of substrates;
 (b) forming alignment films on the faces of the substrates to cover the electrodes, respectively,
 (c) forming a first surface region and a second surface region at a surface of at least one of the alignment films;
 (d) holding the substrates to oppose the alignment films without subjecting the alignment films to alignment treatment;
 (e) injecting a liquid crystal having a chiral nematic phase between the substrates with the liquid crystal and the alignment films heated at a temperature which is a higher temperature of an NI point and the predetermined temperature; and
 (f) cooling the liquid crystal and the alignment films so that the liquid crystal molecules form a plurality of microscopic domains, each of the microscopic domains having liquid crystal molecules aligned uniformly in a vicinity of the alignment films, the liquid crystal molecules in different microscopic regions being arranged in different directions with respect to one another.

23. A method according to claim 22, wherein step (c) includes the step of irradiating an active energy ray onto a part of the alignment films.

24. A method according to claim 22, wherein step (c) includes the step of removing a part of the alignment films.

* * * * *